(12) United States Patent
Danieau et al.

(10) Patent No.: US 9,821,236 B2
(45) Date of Patent: Nov. 21, 2017

(54) METHOD AND DEVICE FOR CONTROLLING A HAPTIC DEVICE

(71) Applicant: THOMSON LICENSING, Issy les Moulineaux (FR)

(72) Inventors: Fabien Danieau, Rennes (FR); Julien Fleureau, Rennes (FR); Philippe Guillotel, Vern sur Seiche (FR); Nicolas Mollet, Meillac (FR); Anatole Lecuyer, Rennes (FR); Marc Christie, Servon sur Vilaine (FR)

(73) Assignee: THOMSON LICENSING, Issy-les Moulineaux (FR)

( * ) Notice: Subject to any disclaimer, the term of this patent is extended or adjusted under 35 U.S.C. 154(b) by 0 days.

(21) Appl. No.: 15/025,268

(22) PCT Filed: Sep. 26, 2014

(86) PCT No.: PCT/EP2014/070618
§ 371 (c)(1),
(2) Date: Mar. 26, 2016

(87) PCT Pub. No.: WO2015/044344
PCT Pub. Date: Apr. 2, 2015

(65) Prior Publication Data
US 2016/0236101 A1    Aug. 18, 2016

(30) Foreign Application Priority Data
Sep. 26, 2013 (EP) .................................... 13306327

(51) Int. Cl.
*H04B 3/36* (2006.01)
*A63G 31/16* (2006.01)
(Continued)

(52) U.S. Cl.
CPC ............... *A63G 31/16* (2013.01); *G09B 9/02* (2013.01); *G09B 9/04* (2013.01); *G09B 9/06* (2013.01);
(Continued)

(58) Field of Classification Search
CPC . A63G 31/16; G09B 9/02; G09B 9/04; G09B 9/06; G09B 9/08; G09B 9/28; G09B 23/28
(Continued)

(56) References Cited

U.S. PATENT DOCUMENTS

| 5,868,687 A | * | 2/1999 | Tedesco ................... A61H 1/00 297/188.01 |
| 8,393,902 B2 | | 3/2013 | Vanbiervliet et al. |

(Continued)

FOREIGN PATENT DOCUMENTS

| FR | 2950187 | 3/2011 |
| WO | WO0133760 | 5/2001 |
| WO | WO2011032937 | 3/2011 |

OTHER PUBLICATIONS

Liao et al., "A Novel Washout Filter Design for a Six Degree-of-Freedom Motion Simulator", JSME international Journal, Series C, vol. 47, No. 2, 2004, pp. 626-636.
(Continued)

*Primary Examiner* — Daryl Pope
(74) *Attorney, Agent, or Firm* — Volpe & Koenig, P.C.

(57) ABSTRACT

A method and device for controlling at least one force-feedback device associated with at least a part of the body of a user. As to control the user's experience of motion and movements induced by the displacement(s) of the force feedback device(s) following operations are performed: [a] determining a speed value of a movement of the at least a part of the body according to at least a parameter represen-
(Continued)

tative of the displacement of the at least one force-feedback device, the movement of the at least a part of the body being induced by the displacement of the at least one force-feedback device; [b] comparing the determined speed value with a threshold speed value as to determine whether the displacement of the at least one force-feedback device is perceived by the user; and [c] controlling the at least one parameter according to the comparison result.

12 Claims, 8 Drawing Sheets

(51) Int. Cl.
    *G09B 9/02*        (2006.01)
    *G09B 9/06*        (2006.01)
    *G09B 9/08*        (2006.01)
    *G09B 9/28*        (2006.01)
    *G09B 23/28*      (2006.01)
    *G09B 9/04*        (2006.01)

(52) U.S. Cl.
    CPC ............... *G09B 9/08* (2013.01); *G09B 9/28* (2013.01); *G09B 23/28* (2013.01)

(58) Field of Classification Search
    USPC .................. 340/407.1, 573.1; 601/49, 56–61
    See application file for complete search history.

(56) References Cited

U.S. PATENT DOCUMENTS

| | | | |
|---|---|---|---|
| 2003/0134676 A1* | 7/2003 | Kang | A63F 13/08 463/36 |
| 2003/0171190 A1* | 9/2003 | Rice | A63F 13/06 482/57 |
| 2012/0229264 A1 | 9/2012 | Bosch et al. | |
| 2015/0158494 A1* | 6/2015 | Lee | B60W 40/08 324/671 |

OTHER PUBLICATIONS

Wang et al., "Predictive washout filter design for vr-based motion simulator", 2004 IEEE International Conference on Systems, Man and Cybernetics, The Hague, Netherlands, Oct. 10, 2004, pp. 6291-6295.

Dorbolo et al., "Improvements in Motion Drive Algorithms", Proceedings of the 1987 Summer Computer Simulation Conference, 1987, pp. 721-723.

Fischer et al., "Applied motion cueing strategies for three different types of motion systems", Journal of Computing and Information Science in Engineering, vol. 11, No. 4, Dec. 2011, pp. 1-10.

Danieau et al., HapSeat: Producing Motion Sensation with Multiple Force-feedback Devices Embedded in a Seat, VRST'12, Dec. 10-12, 2012, pp. 1-8, Toronto, Ontario, Canada.

Danieau et al., A Framework for Enhancing Video Viewing Experience with Haptic Effects of Motion, IEEE Haptics Symposium 2012, Mar. 4-7, pp. 541-546, Vancouver, BC, Canada.

Dasgupta et al., The Stewart Platform Manipulator: A Review, Mechanism and Machinery Theory 35 (2000), Jan. 13, 1998, pp. 15-40.

Harris et al., Simulating Self-Motion 1: Cues for the Perception of Motion, Center for Vision Research and Department of Computer Science, 2002, pp. 75-85, Ontario, Canada.

Jones, Lynette A., Kinesthetic Sensing, Human and Machine Haptics, MIT Press, 2000, pp. 1-10, Cambridge, Massachusetts.

Lecuyer et al., Can Haptic Feedback Improve the Perception of Self-Motion in Visual Reality?, INRIA/IRISIA, pp. 1-8.

Nehaoua et al., Design and Control of a Small-Clearance Driving Simulator, IEEE Transactions on Vehicular Technology, vol. 57, No. 2, Mar. 2008, pp. 736-746.

Welman, Cris, Inverse Kinematics and Geometric Constraints for Articulated Figure Manipulation, Thesis, Simon Fraser University, Sep. 1993, pp. 1-84.

Slob, J.J. (Jelmer), State-of-The-Art Driving Simulators, a literature Survey, DCT Report, Eindhoven University of Technology, Aug. 2008, Eindhoven, pp. 1-19.

* cited by examiner

METHOD AND DEVICE FOR CONTROLLING A HAPTIC DEVICE

This application claims the benefit, under 35 U.S.C. §365 of International Application PCT/EP2014/070618, filed Sep. 26, 2014, which was published in accordance with PCT Article 21(2) on Apr. 2, 2015 in English and which claims the benefit of European patent application No. 13306327.1 filed Sep. 26, 2013.

1. DOMAIN OF THE INVENTION

The invention relates to the domain of haptics. The invention is also understood in the context of haptic effect(s) of motion rendered by using one or more force-feedback devices. The invention may for example be implemented in automobile or aircraft simulators, video games, theme park attractions, at home for the rendering of haptic effects while watching a movie, or in auditoriums, for example movie theatres.

2. PRIOR ART

According to the prior art, it is known to design motion simulators to make an audience member feel motion. Motion simulators are intensively used as driving or flight simulators for learning purposes or for enhancing video viewing experience with haptic effects of motion. Most of them are based on the Stewart's platform (B. Dasgupta, "The Stewart platform manipulator: a review", Mechanism and Machine Theory, Vol. 35, Issue 1, pp. 15-40, January 2000). A motion simulator is basically a seat attached on this kind of platform that may be especially used to enhance audiovisual experience. With such motion simulators, the user's whole body is moved to generate various sensations such as accelerating, falling or passing over bumps. Such motion simulators have an effect on the vestibular system organ of the user that is located in the inner ear and that is composed of three orthogonally oriented semi-circular canals and two otolith organs. Semi-circular canals allow to detect rotational movements (angular accelerations) while otolith organs send information to the brain about linear accelerations. A user is able to sense acceleration and rotation of his body and this way feels movement. But these motion simulators based on Stewart's platform remain expensive, which limits their usage.

The sensation of motion may also be induced by a force feedback device, as disclosed in WO2011/032937. By applying a force on the user's hand, the system generates an illusion of motion with force feedback. While the interface is pulling the hand, the user feels moving forward. A force feedback device addresses the kinaesthetic sense of a user. As force feedback devices have an effect on the kinaesthetic sense of a user and not on the vestibular system organ of the user, methods adapted to control the displacements of the Stewart's platform and the haptic effects associated with such displacements are not adapted to control the force feedback devices and associated haptic effects.

3. SUMMARY OF THE INVENTION

The purpose of the invention is to overcome at least one of these disadvantages of the prior art.

More specifically, the purpose of the invention is to control the user's experience of motion and movements induced by the displacement(s) of force feedback device(s).

The invention relates to a method for controlling at least one force-feedback device associated with at least a part of the body of a user. The method comprises the steps of:
  determining a speed value of a movement of the at least a part of the body according to at least a parameter representative of the displacement of the at least one force-feedback device, the movement of the at least a part of the body being induced by the displacement of the at least one force-feedback device;
  comparing the determined speed value with a threshold speed value as to determine whether the displacement of the at least one force-feedback device is perceived by the user;
  controlling the at least one parameter according to the comparison result.

According to a particular characteristic, the determining of the speed of the movement of the at least a part of the body is obtained from a biomechanical model of the at least a part of the body.

Advantageously, the threshold speed value is determined from biomechanical constraints associated with the at least a part of the body.

According to a specific characteristic, the displacement of the at least one force-feedback device is perceived by the user when the determined speed value is greater than or equal to the threshold speed value.

Advantageously, the controlling of the at least one parameter comprises modifying said at least one parameter when the displacement of the at least one force-feedback device is perceived by the user.

According to another characteristic, the at least one parameter belongs to a group of parameter comprising:
  the amplitude of the displacement;
  the starting time of the displacement;
  the duration of the displacement;
  the starting position of the displacement;
  the speed of the displacement.

The invention also relates to a device configured for controlling at least one force-feedback device associated with at least a part of the body of a user, the device comprising at least one processor configured for:
  determining a speed value of a movement of the at least a part of the body according to at least a parameter representative of the displacement of the at least one force-feedback device, the movement of the at least a part of the body being induced by the displacement of the at least one force-feedback device;
  comparing the determined speed value with a threshold speed value as to determine whether the displacement of the at least one force-feedback device is perceived by the user;
  controlling the at least one parameter according to the comparison result.

Advantageously, the at least one processor is configured for determining the speed of the movement of the at least a part of the body from a biomechanical model of the at least a part of the body.

According to a specific characteristic, the at least one processor is further configured for determining the threshold speed value from biomechanical constraints associated with the at least a part of the body.

According to another characteristic, the displacement of the at least one force-feedback device is perceived by the user when the determined speed value is greater than or equal to the threshold speed value.

Advantageously, the at least one processor is further configured for modifying the at least one parameter when the displacement of the at least one force-feedback device is perceived by the user.

According to a specific characteristic, the device comprises means for displaying an information representative of the possibility to perceive the displacement of the at least one force-feedback device by the user.

The invention also relates to a computer program product comprising instructions of program code for execution by at least one processor to perform the method for controlling at least one force-feedback device, when the program is executed on a computer.

4. LIST OF FIGURES

The invention will be better understood, and other specific features and advantages will emerge upon reading the following description, the description making reference to the annexed drawings wherein.

Figure 1A:
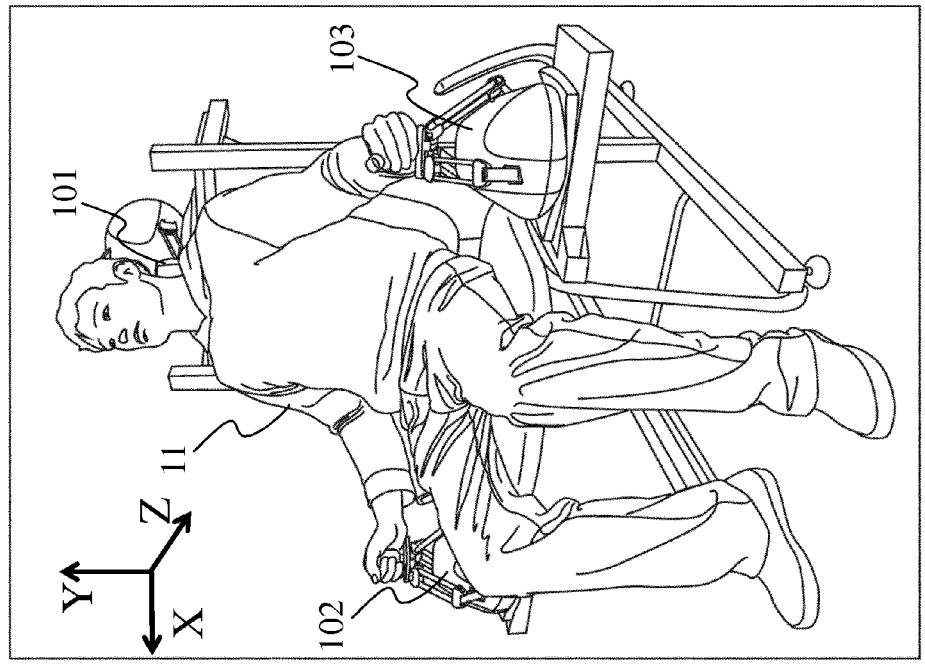
FIGS. 1A and 1B show a motion simulator comprising force feedback devices, according to a particular embodiment of the invention.
Figure 1B:
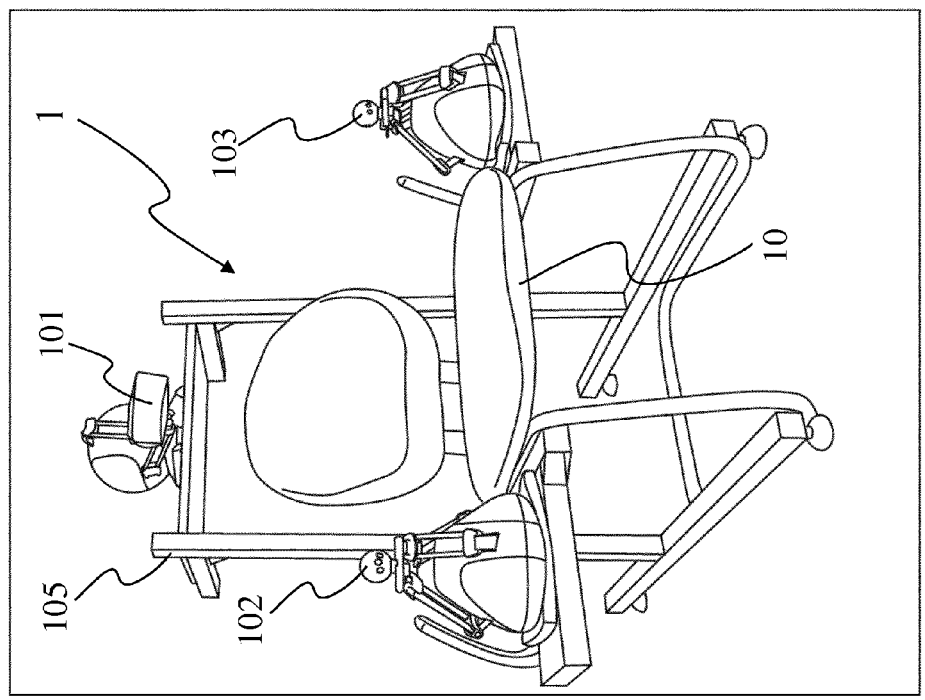
Figure 5:
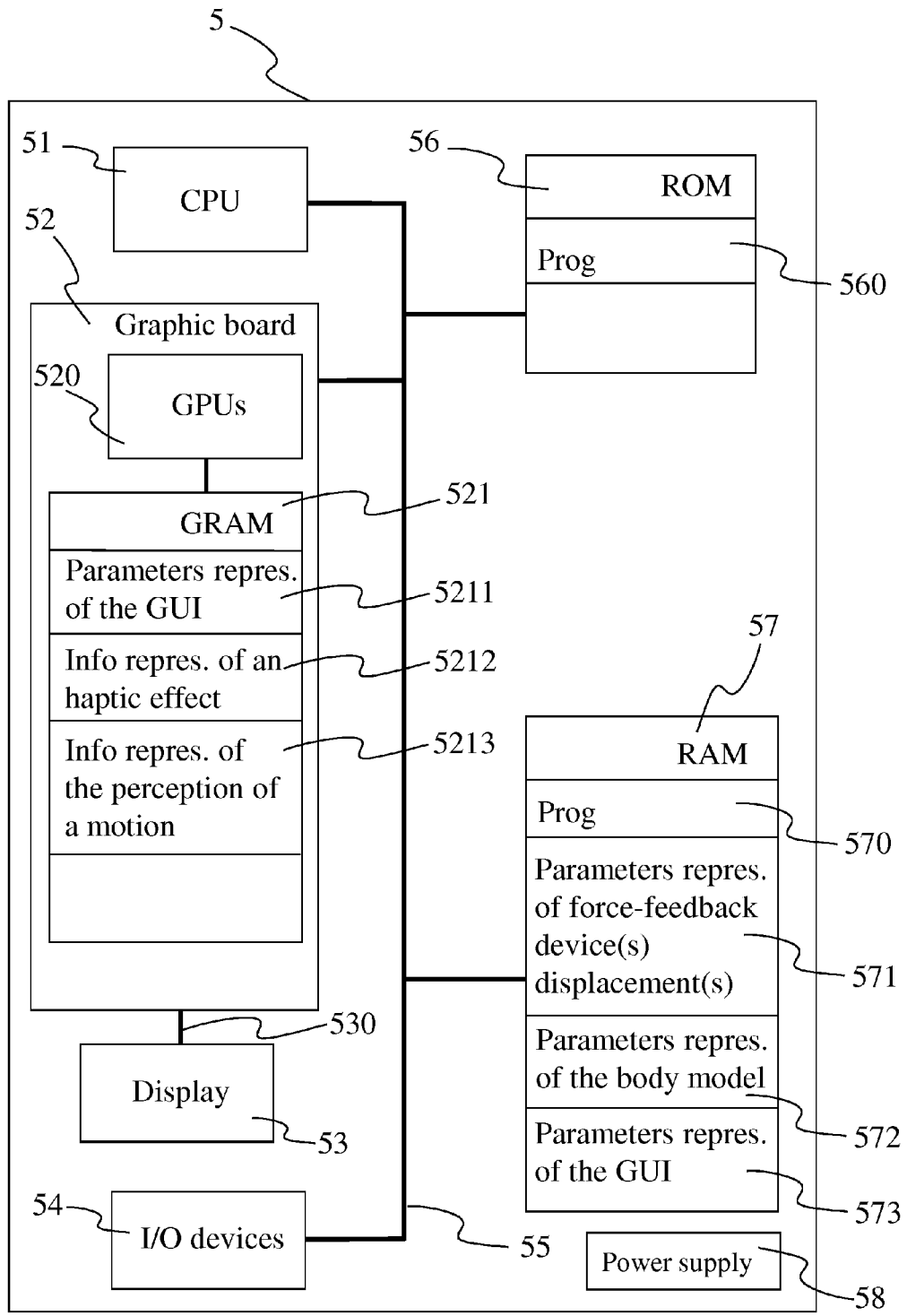
Figure 6:
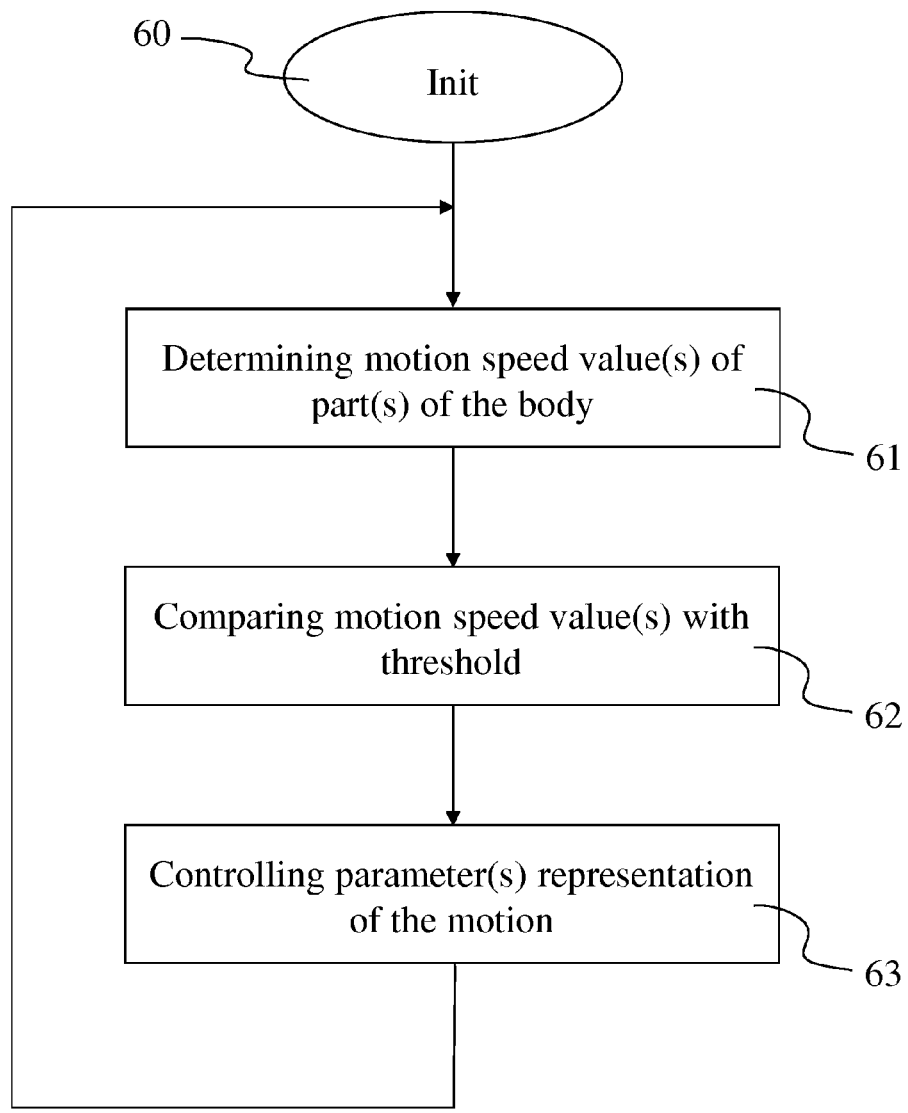
Figure 7:
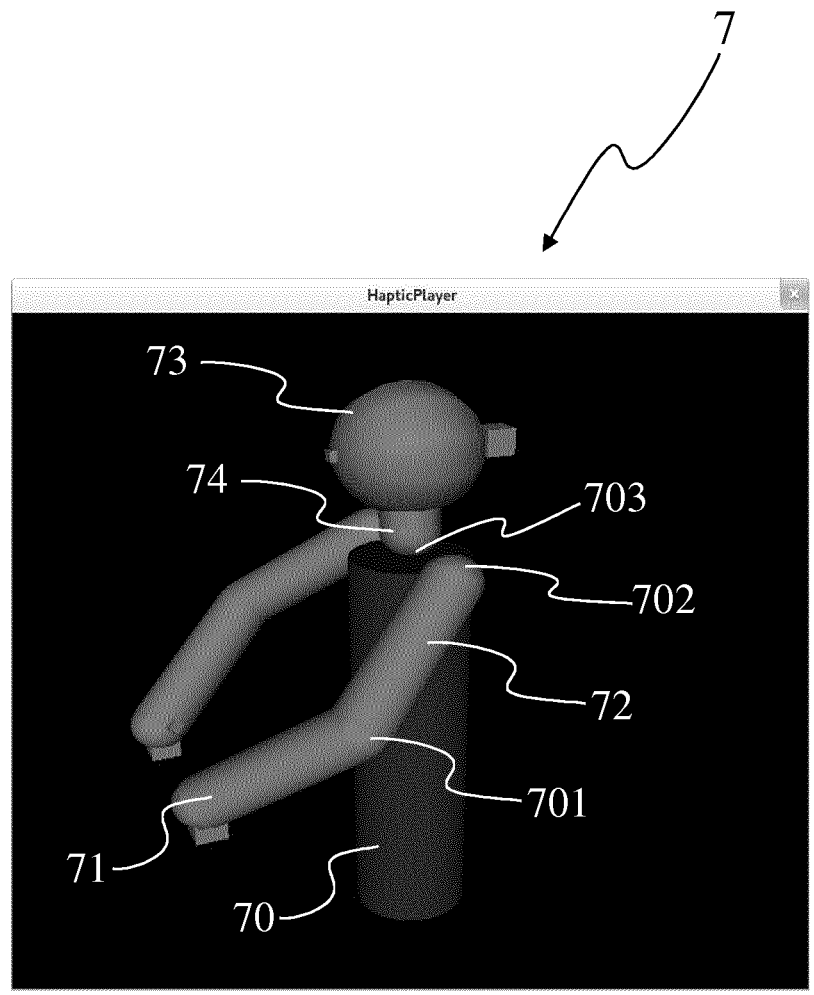

FIG. 5 diagrammatically shows a device implementing a method for controlling the motion simulator of FIGS. 1A and 1B, according to a particular embodiment of the invention;

FIG. 6 shows a method for controlling the motion simulator of FIGS. 1A and 1B, according to a particular embodiment of the invention;

FIG. 7 shows a model of a user using the motion simulator of FIGS. 1A and 1B, according to a particular embodiment of the invention.

5. DETAILED DESCRIPTION OF EMBODIMENTS OF THE INVENTION

The invention will be described in reference to a particular embodiment of a method for controlling one or more force feedback devices, forming for example a motion simulator. Each force feedback device is advantageously associated with a part of the body (for example an arm, the head, a leg) of a user and the displacement of the force feedback device drags the associated part of the body into movement. Parameter(s) representing the displacement of the force feedback device(s) is (are) used for determining the speed of the movement of the part of the body that is induced by the force feedback device associated with this part of the body. Comparing the speed value thus determined with a threshold speed value enables to determine whether the displacement of the part of the body is perceived by the user. According to the comparison result, the parameter(s) representing the displacement of the force feedback device(s) is (are) controlled, for example to increase or decrease the speed of the movement(s) of the part(s) of the body induced by the displacement(s) of the force-feedback device(s). This enables advantageously to manage the experience of movement's effect experience of a user which may be useful as to increase the effect if it's too low or as to decrease the effect in a way that the effect is no more perceived by the user, for example for a washout filter.

FIG. 1A shows a motion simulator 1, according to a particular and non-limitative embodiment of the invention and FIG. 1B shows a user 11 sat down on the motion simulator 1 of FIG. 1A. To this end, the motion simulator comprises advantageously a chair 10 advantageously comprising a seat and a back. According to a variant, the chair 10 only comprises a seat and no back. Two hand force-feedback devices 102 and 103 are located on either sides of the chair 10. Hands of the user each lie on one of the hand force-feedback devices 102, 103. The hand force-feedback devices 102 and 103 are positioned in such a way that the user 11 seizes them easily. A third force-feedback device 101, called head force-feedback device, is positioned at the level of the back of the head, i.e. in place of a headrest. The force-feedback devices 101, 102 and 103 are advantageously positioned on a framework 105 configured in such a way that the force-feedback devices are positioned as to be in contact with specific parts of the body of the user, for example the hands and the head. The position of each of the force-feedback device 101 to 103 is advantageously adjustable as to adapt to the size and the morphology of the user 11. To that aim, the framework 105 is for example adjustable, i.e. the distance between the hand force-feedback devices 102 and 103 is for example adjustable and/or the distance between the seat of the chair 10 and the head force-feedback device is for example adjustable. As it appears on FIG. 1B, the user 11 has in each hand the knob of a force-feedback device 102, 103 and the head of the user 11 rests on the head force-feedback device 101. The displacements of the force feedback devices 101 to 103 according to the axis X, Y and Z (the axis X, Y and Z forming an orthonormal basis) induce movements of the limbs and of the head of the user. The displacements of the force-feedback devices are advantageously controlled via parameters representing for example the initial and final coordinates of the force-feedback device expressed in the orthonormal basis X, Y and Z (the initial coordinates corresponding to the initial position of the force-feedback device at the start of the displacement and the final coordinated corresponding to the final position of the force-feedback device at the end of the displacement) and also the start time and the end time of the displacement. According to a variant, the parameters controlling the displacement(s) of the force-feedback device(s) comprise the initial and final coordinates with the speed and/or the acceleration of the displacement(s).

Naturally, the number of force-feedback devices is not limited to three but extends to any number greater than or equal to 1, any combination of the following list being possible:
one force-feedback device associated with the head of the user;
one force-feedback device associated with each hand of the user;
one force-feedback device associated with each foot of the user;
one force-feedback device associated with the back of the user;
one force-feedback device associated with both hands of the user;
one force-feedback device associated with both feet of the user.

For example, the number of force-feedback devices may be five, i.e. one force-feedback associated with the head of the user 11, one force-feedback device associated with each hand of the user 11 and one force-feedback device associated with each foot of the user 11. According to other examples, the number of force-feedback devices may be two, i.e. one force-feedback device associated with both hands and one force-feedback associated with both feet, or one force-feedback device associated with both hands and one force-feedback device associated with the head; the number of force-feedback devices may be three, for example one force-feedback device associated with the back, one force-feedback associated with each hand; etc.

Each force-feedback device 101 to 103 is advantageously configured for doing translation displacement/movement along each axis X, Y and Z and thus has three degrees of freedom. The combination of the two force-feedback devices 102, 103 stimulating the user's hands and of the force-feedback device 101 stimulating the user's head, each force-feedback device 101 to 103 having 3 degrees of freedom, enables to simulate six degrees of freedom effects of motion. The user 11 who is stimulated by these three force-feedback devices then feels various sensations such as accelerating, braking, falling for example. The sensations of motion he/she is feeling are advantageously related to a visual content the user is watching at.

According to a variant, the user does not have direct contact with the force-feedback devices, or at least with some of the force-feedback devices. According to this variant, the movements of the parts of the body of the user 11 induced by the force-feedback devices are transmitted from the force-feedback device to the limb/part of the body of the user through mobile elements of the framework 105, for example through armrest(s) or mobile plate.

According to another variant, the user stands up and the motion simulator does not comprise any chair but only one or more force-feedback devices positioned on the framework 105.

Figure 2:
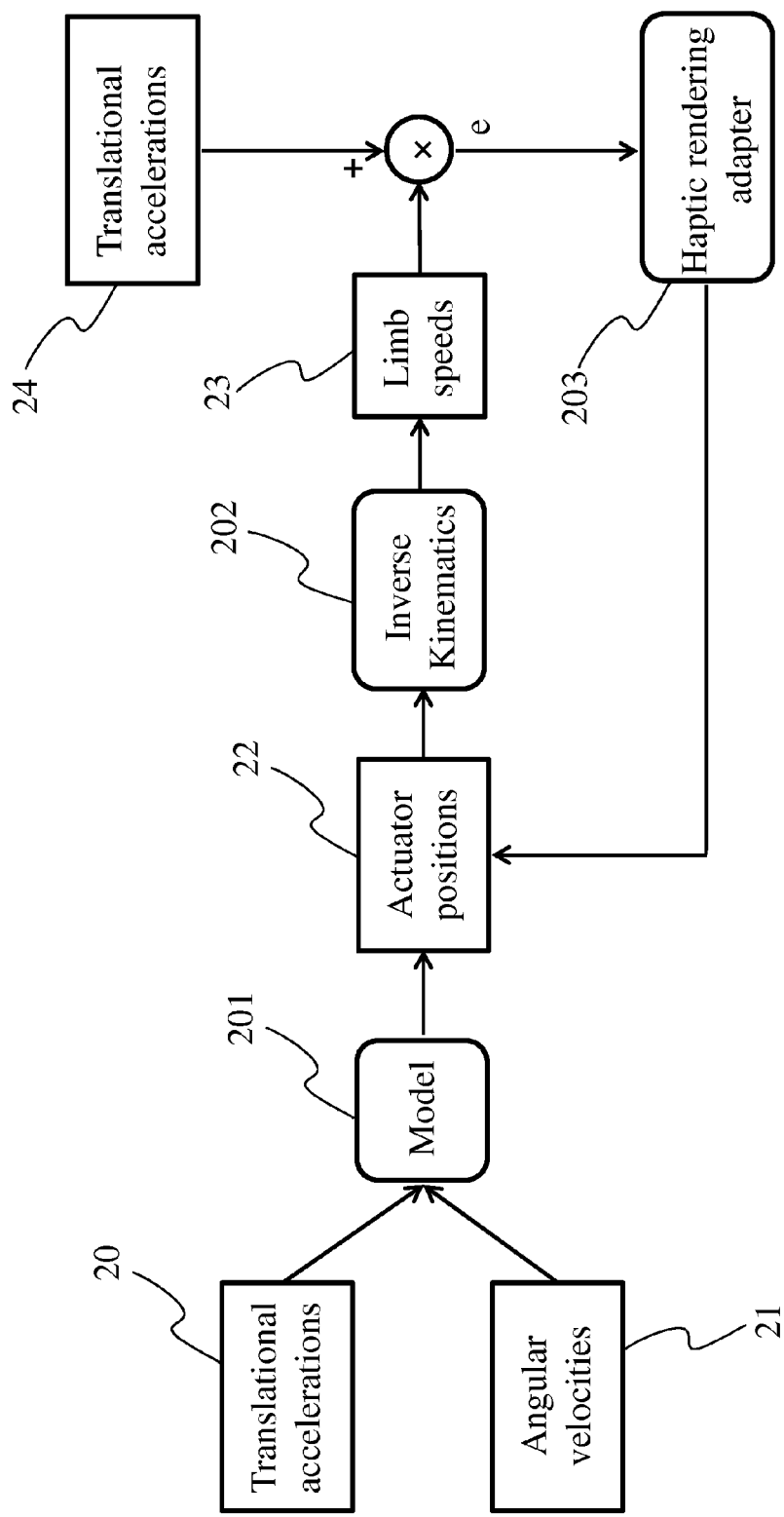
FIG. 2 shows the control of the motion simulator of FIGS. 1A and 1B, according to a particular embodiment of the invention.

FIG. 2 illustrates the control of a force-feedback device 101, 102 or 103 of the motion simulator 1, according to a particular and non-limitative embodiment of the invention.

A biomechanical model of the body of the user 11 is defined. The biomechanical model may be for example a simplified biomechanical model of the body of the user as illustrated on FIG. 7. The biomechanical model 7 is represented by a torso. Representation of the arms of the user consist in two segments 71 and 72 and two joints 701 and 702. The segment 71 represents the forearm of the user and the segment 72 represents the upper part of the arm of the user. The segment 71 is connected with the segment 72 via a joint 701 corresponding to the elbow of the user. The segment 72 is connected with the torso 70 of the user via the joint 702, which corresponds to the elbow. The neck is represented with one segment 74 and one joint 703 connecting the neck and the head 73 with the torso 70. The dimensions of the segments, notably their length, and the angle limits of the rotations that the joints are capable of are defined with anatomical data (see for example "*General Anatomy and Musculoskeletal System*" by Schuenke M., Schulte E., Schumacher U., Ross L. M., Lamperti E. D. and Voll M.; Thieme Medical Publishers Inc, 2010).

The first step for controlling the force-feedback device is the command law for the force-feedback device. The displacement of the force-feedback device, for example the final position 22 of the force-feedback device at the end of the displacement, is computed from a command law model 201 and from motion data that comprises data representative of translational accelerations 20 and data representative of angular velocities 21, as described in "*HapSeat: Producing Motion Sensation with Multiple Force-feedback Devices Embedded in a Seat*" by Danieau et al., VRST'12, Dec. 10-12, 2012, Toronto, Ontario, Canada. The translational accelerations data 20 and angular velocities data 21 describe advantageously the general motion that is to be felt by the user sat on the motion simulator 1. The general motion corresponds for example to a motion comprised in a sequence of a movie the user is watching at or to a motion of an avatar of the user in a video game the user is playing at. The audiovisual content the user is watching at is advantageously augmented with the translational accelerations data 20 and angular velocities data 21, according to any method known by the skilled person in the art (the video camera shooting the audiovisual content is for example equipped with an inertial measurement unit configured for measuring the data 20 and 21). These data 20 and 21 are then extracted as to be inputted in the command law model 201. At the output of the command law model 201 are obtained parameters (for example the end position of the force-feedback devices or the acceleration(s) of the force-feedback devices during the displacement(s)) used for controlling the displacements of each one of the force-feedback devices 101 to 103 forming the motion simulator 1.

In a second step, the speed of the movement done by the part of the body (for example a limb) is calculated from the final position 22 of the force-feedback device inducing the movement of this specific part of the body, by using for example an inverse kinematics (IK) algorithm 202 (see for example "Inverse kinematics and geometric constraints for articulated figure manipulation" by Chris Welman, Simon Fraser University) and from the biomechanical model 7. Given the parameters 22 representative of the displacement (e.g. the final position) of the force-feedback device and the biomechanical model of the part of the body associated with the force-feedback device, IK algorithm provides the angles of the joints impacted by the movement of the part of the body induced by the associated force-feedback device. If one considers the force-feedback 103 of FIGS. 1A and 1B, the part of the body associated with it is the arm of the user (modelled with the segments 71 and 72 of FIG. 7) and the joints impacted by the movement of the arm are the elbow 701 and the shoulder 702. Examples of IK algorithm are the CCD (Cyclic Coordinate Descent) algorithm and the Jacobian Transpose Method. The CCD algorithm corresponds for instance to an iterative method which minimizes the distance between the end of the part of the body (also called end effector, for example the hand of the user in contact with the force-feedback device 103) associated with the force-feedback device and the final position of the force-feedback device by modifying the angle of each joint of the part of the body impacted by the movement. When several joints are impacted, the method starts by modifying the angle of the joint closest to the end effector (e.g. the elbow 701 in the abovementioned example) and then goes to the next farthest (e.g. the shoulder 702 in the abovementioned example) and so on.

In a second step, the speed value of the movement of the part of the body is then compared with a threshold speed value as to determine whether the movement of the part of the body (and thus the displacement of the force-feedback device inducing the movement) is perceived by the user. The threshold speed value is also called kinaesthetic perception threshold. The term kinesthesia refers to the perception of limb movement and position, and is often broadly defined to include the perception of force as well. These sensory perceptions originate primarily from the activity of mechanoreceptors in muscles, which provides the central nervous system with information about the static length of muscles, the rate at which muscle length changes, and the forces muscles generate. From these signals comes our awareness of where our limbs are in space, when our limbs have moved, and the mechanical properties of objects (e.g. weight, compliance) with which they interact. Sensory information about changes in limb position and movement also arises from other sources, namely receptors in the skin and joints. These inputs appear to be particularly important for kinesthesia in the hand, as both joint and/or cutaneous anesthesia impairs the ability to detect finger movements and perceive finger positions. For more proximal joints, such as the knee, joint and/or skin, anesthesia does not have a significant influence on the perception of limb position. It is known for example from "*Kinesthetic Sensing*" by Lynette A. Jones, published in Human and Machine Haptics, MIT Press, 2000, that the ability to detect movements of a limb depends on several factors including the velocity of the movement, the particular joint moving, and the contractile state of the muscles controlling the joint. Faster movements are easier to detect than slower movements, and for the distal joints of the fingers, thresholds decrease from 8° to 1° as the movement velocity increases from 1.25°/s to 10°/s. The threshold then remains essentially constant at 1° over the velocity range of 10-80°/s (Hall & McCloskey, 1983). Movements of proximal joints such as the elbow or shoulder are easier to detect than movements of the same amplitude made by more distal joints such as the metacarpophalangeal joints at the base of the fingers in the hand. This superior performance of more proximal joints is not surprising given that they move more slowly than distal joints, and that rotation of these joints results in a larger displacement of the end-point of the limb than the same angular rotation at a more distal joint. For example, when the shoulder rotates 1° the middle fingertip of the outstretched arm moves 13 mm, whereas a 1° rotation of the distal interphalangeal joint of the middle finger results in only a 0.5 mm movement of the fingertip. It is thus clear that proximal joints of the human body are more sensitive than distal joints. The detection threshold for an elbow is for example about 1°/s and it is less for a shoulder, i.e. for example about 0.5°/s. From these biomechanical constraints 24 and from the speed 23 of the movement of the considered part of the body, it is determined whether the movement of the considered part of the body is perceived by the user. If the speed value 23 is greater than or equal the threshold speed value (deduced from the biomechanical constraints 24), then the movement of the considered part of the body is perceived by the user, which means that the displacement of the force-feedback device associated with the considered part of the body is perceived by the user. If the speed value 23 is less than the threshold speed value (deduced from the biomechanical constraints 24), then the movement of the considered part of the body is not perceived by the user, which means that the displacement of the force-feedback device associated with the considered part of the body is not perceived by the user.

According to the comparison result, the parameters controlling the displacement of the force-feedback device may be adapted by for example a haptic rendering adapter 203. For instance, if the comparison result shows that the displacement of the force-feedback will not be perceived by the user because the initial parameters of the force-feedback device are not adapted to that aim, then the parameters are modified in a way as to make the displacement perceived by the user. The amplitude of the displacement may be increased or the acceleration of the translation(s) associated with the displacement is increased. When the objective of the displacement is to perform a washout filter, i.e. to make the force-feedback come back to an initial position (for example a rest position) without that the user feels the displacement, and if the comparison result shows that the displacement will be perceived by the user, then the parameters are adapted in a way as to make the displacement not perceived by the user. The amplitude and/or the acceleration of the displacement may then be decreased.

The second and third steps are advantageously reiterated for each one of the force-feedback devices 101 to 103 forming the motion simulator 1.

FIGS. 3A to 3E show haptic effects induced by the displacement of for example one of the force feedback devices of the motion simulator 1, according to specific and non-limitative embodiments of the invention. The examples of FIGS. 3A to 3E corresponds to the position of a force-feedback associated with one part of the body of the user, for example the head. Abscissa axis represents the time in seconds (s) and ordinate axis represents the position of the force-feedback device expressed in meters (m).

Figure 3A:
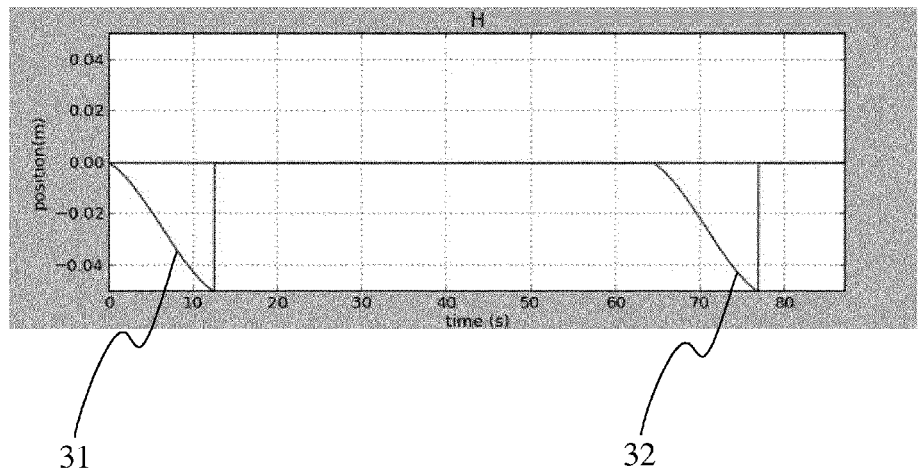
FIGS. 3A to 3E show haptic effects induced by the displacement of the force feedback device(s) of the motion simulator of FIGS. 1A and 1B, according to particular embodiments of the invention.

FIG. 3A illustrates the displacement of one force-feedback device along the X axis, according to a first example. Two haptic effects 31 and 32 are illustrated. The first effect 31 starts at time 0 and position 0.00 m and ends at time 12 s at position −0.05 m. The second effect 32 starts at time 65 s and position 0.00 m and ends at time 78 s at position −0.05 m. At the end of the first effect 31, the force-feedback device returns directly to the "zero" position (i.e. 0.00 m) to be ready to render the next effect without washout, which means that the user feels when the force-feedback device returns to the rest position (i.e. 0.00 m). This strong movement of the considered part of the body, the speed of which being greater than the kinaesthetic perception speed, is felt by the user and may be confusing regarding the user experience. The second effect 32 is similar to the first effect 31, i.e. without washout.

Figure 3B:
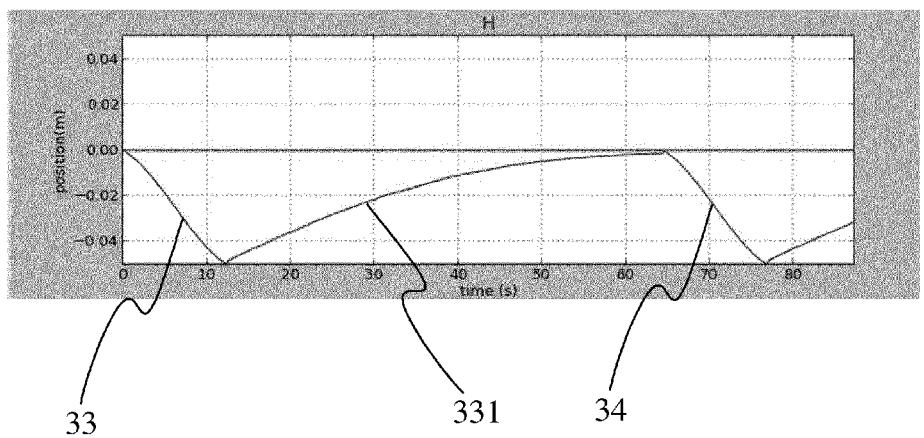

FIG. 3B illustrates the displacement of the force-feedback device along the X axis, according to a second example. Two haptic effects 33 and 34 are illustrated. The first effect 33 starts at time 0 s and position 0.00 m and ends at time 12 s at position −0.05 m. The second effect 34 starts at time 65 s and position 0.00 m and ends at time 78 s at position −0.05 m. In contrast to FIG. 3A, a washout is performed between the end of the first effect 33 and the start of the second effect 34, which is illustrated by the outline 331. During the washout 331, the force-feedback device returns slowly and imperceptibly to the "zero" (or rest) position. The speed of the force-feedback device is less than the kinaesthetic perception speed and the user thus does not feel the displacement of the force-feedback device during the two haptic effects 33 and 34. The user experience is then better as the user only feels the two haptic effects 33 and 34 (which correspond for example to a motion in a movie the user is watching at or a motion of an avatar in a video game the user is playing at) without feeling the washout.

Figure 3C:
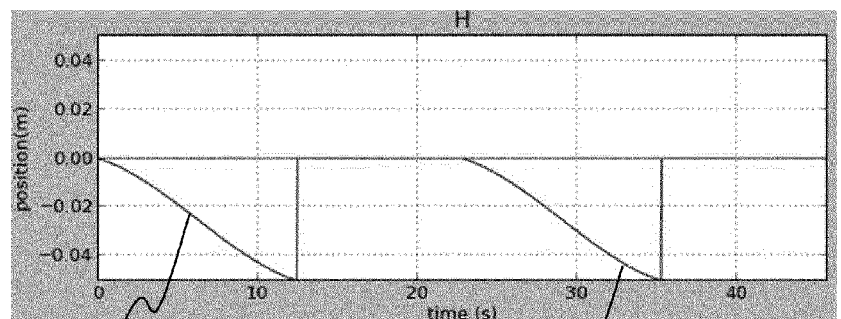

FIG. 3C illustrates the displacement of the force-feedback device along the X axis, according to a second example. Two haptic effects 35 and 36 are illustrated. The first effect 35 starts at time 0 s at position 0.00 m and ends at time 12 s at position −0.05 m. The second effect 36 starts at time 23 s at position 0.00 m and ends at time 35 s at position −0.05 m. In contrast to FIG. 3B and as in FIG. 3A, there is no washout between the end of the first effect 35 and the start of the second effect 36. Indeed, at the end of the first effect 35, the force-feedback device returns quickly to the "zero" (or rest)

position with a speed greater than the kinaesthetic perception speed. But in contrast to FIG. 3A where there is no washout but time for it (as illustrated on FIG. 5B), the time difference between the end of the first effect 35 (at time 12 s) and the start of the second effect 36 (at time 23 s) is not enough for performing a washout. This is illustrated with more details on FIG. 3D.

Figure 3D:
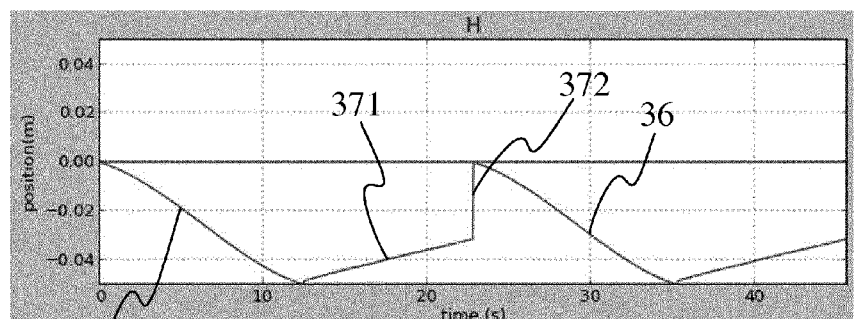

FIG. 3D illustrates the same first 35 and second 36 effects as on FIG. 3C. The outline 371 starting at time 12 s (at the end of the first effect 35) illustrates a washout, i.e. a displacement of the force-feedback device at a speed less than the kinaesthetic perception speed. But as it clearly appears on FIG. 3D, the time difference between the end of the first effect 35 and the start of the second effect 36 is not long enough as to link the end of the first effect and the start of the second effect at a speed less than the kinaesthetic perception speed. At a speed just below the kinaesthetic perception speed and starting from the end of the first effect 35 (at position −0.05 m and at time 12 s) the force-feedback device will reach only the position −0.035 m at time 23 s (corresponding to the start of the second effect 36), then forcing the force-feedback device to reach the "zero" (or rest) position with a strong displacement at a speed much greater than the kinaesthetic perception speed, this strong displacement being illustrated by the outline 372. Such a strong displacement 372 will then be felt by the user leading to an unwanted haptic effect, i.e. a bad user experience.

As to overcome the issue created by the lack of time between the two haptic effects 35 and 36, an optimization step may be performed to modify at least one of the two haptic effects 35 and 36. One or several parameters, associated with the displacement of the force-feedback device, of the following list may be modified as to enable a washout between the first effect 35 and the second effect 36:

the amplitude of the effect corresponding to the amplitude of the displacement inducing the haptic effect: the amplitude of an effect may be reduced in order to require more time for the washout;

the starting position of the effect corresponding to the starting position of the displacement inducing the haptic effect: by moving the starting position as to move the ending position in such a way that the ending position is closer to the "zero" (or rest) position, it is possible to enable a washout effect in a very short time (while keeping the amplitude of the haptic effect);

the starting time of the effect corresponding to the starting time of the displacement inducing the haptic effect: by moving the starting time and by keeping the same duration, the haptic effect will end sooner, which will give more time for the washout; according to a variant, the starting time of the first effect may be advanced and the starting time of the second effect may be delayed as to increase the time difference between the first and second effects;

the duration of the effect corresponding to the duration of the displacement inducing the haptic effect: by reducing the duration of the effect, the effect will end sooner, giving more time for the washout;

the degrees of freedom: instead of using only one or two of the degrees of freedom of the force-feedback device, the three axis X, Y and Z may be used as to perform the washout;

the kinaesthetic perception speed: by increasing the value of the kinaesthetic perception speed, it is possible to require less time for performing a washout filter; nevertheless, the increasing of the value of the kinaesthetic perception speed is limited as a too high value of the kinaesthetic perception speed will lead to a movement/displacement felt by the user, leading to a bad user experience in case of washout.

Figure 3E:
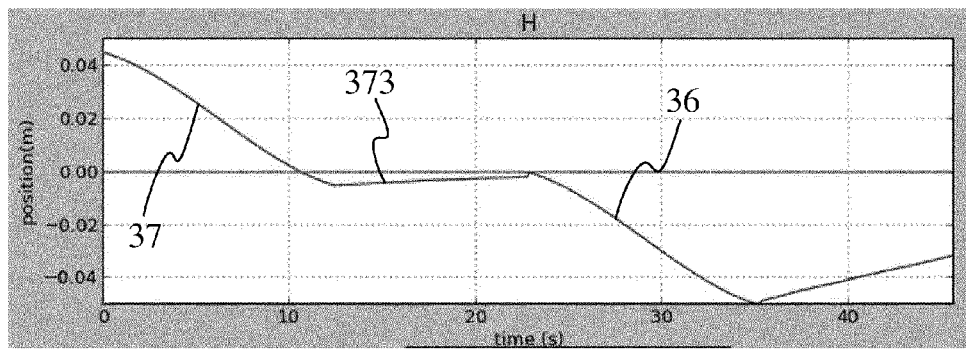

FIG. 3E illustrates the case where the parameters associated with the displacement of the force-feedback device have been modified as to enable a washout filter between the first haptic effect 35 and the second haptic effect 36. In the example illustrated by FIG. 3E, the starting position of the first effect 37 (which corresponds to the first effect 35 of FIGS. 3C and 3D) is moved from 0.00 m (first effect 35) to 0.045 m. The amplitude and the duration of the first effect 37 are the same as the amplitude and the duration of the first effect 35 of FIGS. 3C and 3D. The end position of the first effect is thus moved from −0.05 m (corresponding to the end position of the first effect 35) to −0.005 m, which is very close to the "zero" (or rest) position of the force-feedback device and very close from the starting position of the second effect 36, which is equal to 0.00 m. Thus, even if the time difference between the first effect 37 and the second effect 36 is short, as the position difference between these two effects 37 and 36 is low, it is possible to perform a washout, i.e. a displacement of the force-feedback device that will not be perceived by the user.

Naturally, it is possible to combine the modification of several parameters of the list above to enable a washout, any combination being possible. For example, the starting position and the amplitude of the effect(s) may be modified; or the starting time of the first effect and the starting position of the first effect (and/or of the second effect); or the starting position and the duration of the effect; etc.

Figure 4:
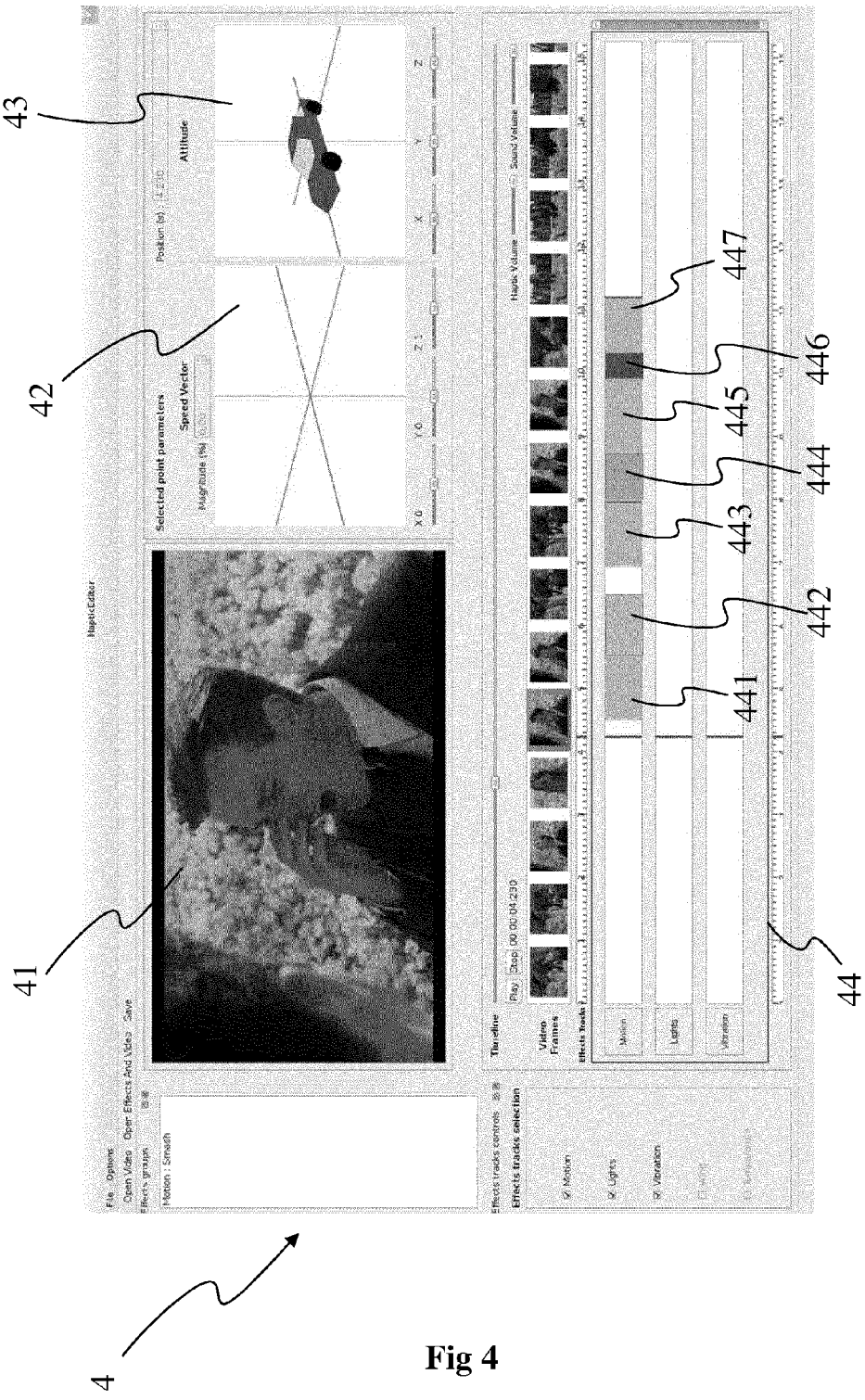
FIG. 4 shows a graphical user interface adapted to assist the control of the motion simulator of FIGS. 1A and 1B, according to a particular embodiment of the invention.

FIG. 4 illustrates a graphical user interface 4 (GUI) adapted to help in controlling the displacement of one or several force-feedback devices of the motion simulator 1, according to a particular and non-limitative embodiment of the invention. The GUI comprises a first part 41 for displaying the image of a movie comprising cinematographic effects to be rendered in a haptic way as to enable a better immersion in the movie of a user watching at the movie; a second part 42 and a third part 43 for the graphical editing of the displacement(s) of the force-feedback device(s), the second part editing for example the translational component of the displacement(s) and the third part editing for example the rotational component of the displacement(s); and a fourth part 44 graphically representing the haptic effects and washout 441 to 447 associated with the image 41. Haptic effects corresponding to cinematographic effects of the image 41 are the effects 441, 443, 445 and 447. Effects that will be felt by the user are advantageously visually identified on the GUI, for example by associating a first specific color or a first specific texture to these effects, and effects that will not be felt by the user are advantageously visually identified on the GUI, for example by associated a second specific color or a second specific texture different from the first color or from the first texture. Thus, the person in charge of the control of the haptic effects is able to identify quickly if the parameters associated with the haptic effects are adapted or not for the rendering of the haptic effects. If not, the parameters may be modified and the person can automatically see the result of the parameters' modification. Effects corresponding to washout are identified with the references 442, 444 and 446. A first color or texture is associated with the washout 442, a second color or texture different from the first one is associated with the washout 444 and a third color or texture different from the first and second ones is associated with the washout 446. The meanings of the first, second and third color or texture are the following:

a washout identified with the first color or texture is a washout that will be not felt by the user, the time for implementing the washout being sufficient and the parameters associated with the displacement of the force-feedback device enabling a speed of the displacement of the force-feedback device less than the kinaesthetic perception speed;

a washout identified with the second color or texture is a washout that will be felt by the user but that may be adapted as not to be felt by the user, by modifying the parameters associated with the displacement of the force-feedback device during the washout and/or by modifying the parameters associated with the displacement(s) of the force-feedback device before one or both of the haptic effect(s) surrounding the washout;

a washout identified with the third color or texture is a washout that will be felt by the user anyway, whatever the values of the parameters associated with the displacement of the force-feedback device during the washout and during the haptic effects surrounding the washout are.

The person controlling the washout is able to identify easily and quickly which washouts are well parameterized, which washouts have to be modified as not to be felt by the user and which washout are impossible.

FIG. 5 diagrammatically illustrates a hardware embodiment of a device 5 configured for controlling the motion simulator 1, according to a particular and non-limitative embodiment of the invention. The device 5 is also configured for the creation of display signals of one or several images, for example images representative of the Graphical User Interface 4. The device 5 corresponds for example to a personal computer (PC), a laptop, a tablet, a Smartphone, a games console or a multimedia terminal.

The device 5 comprises the following elements, connected to each other by a bus 55 of addresses and data that also transports a clock signal:

a microprocessor 51 (or CPU),
a graphics card 52 comprising:
  several Graphical Processor Units (or GPUs) 520,
  a Graphical Random Access Memory (GRAM) 521,
a non-volatile memory of ROM (Read Only Memory) type 56,
a Random Access Memory or RAM 57,
one or several I/O (Input/Output) devices 54 such as for example a keyboard, a mouse, a webcam, and
a power source 58.

The device 5 also comprises a display device 53 of display screen type directly connected to the graphics card 52 to display synthesized images calculated and composed in the graphics card, for example live. The use of a dedicated bus to connect the display device 53 to the graphics card 52 offers the advantage of having much greater data transmission bitrates and thus reducing the latency time for the displaying of images composed by the graphics card. According to a variant, a display device is external to the device 5 and is connected to the device 5 by a cable or wirelessly for transmitting the display signals. The device 5, for example the graphics card 52, comprises an interface for transmission or connection (not shown in FIG. 5) adapted to transmit a display signal to an external display means such as for example an LCD or plasma screen or a video-projector.

It is noted that the word "register" used in the description of memories 521, 56, and 57 designates in each of the memories mentioned, both a memory zone of low capacity (some binary data) as well as a memory zone of large capacity (enabling a whole program to be stored or all or part of the data representative of data calculated or to be displayed).

When switched-on, the microprocessor 51 loads and executes the instructions of the program contained in the RAM 57.

The random access memory 57 notably comprises:
  in a register 570, the operating program of the microprocessor 51 responsible for switching on the device 5,
  parameters 571 representative of the displacement of the force-feedback device(s) of the motion simulator, for example starting time(s) and starting position(s) of the device(s) for each effect/washout, end time(s) and end position(s) of the device(s) for each effect/washout;
  parameters 572 representative of the body model of a user, for example segments and joints forming each part of the body;
  parameters 573 representative of a Graphical User Interface.

The algorithms implementing the steps of the method specific to the invention and described hereafter are stored in the memory GRAM 521 of the graphics card 52 associated with the device 5 implementing these steps. When switched on and once the parameters 571 representative of the displacements of the force-feedback devices, the parameters 572 representative of the body model and the parameters 573 representative of the GUI are loaded into the RAM 57, the graphic processors 520 of the graphics card 52 load these parameters into the GRAM 521 and execute the instructions of these algorithms in the form of microprograms of "shader" type using HLSL (High Level Shader Language) language or GLSL (OpenGL Shading Language) for example.

The random access memory GRAM 521 notably comprises:
  in a register 5211, the parameters representative of the GUI,
  in a register 5212, the parameters representative of haptic effects and/or washout filters computed from the parameters representative of the displacements of the force-feedback devices;
  in a register 5213, information representative of the perception or non perception of a motion by the user, According to a variant, the parameters 571 representative of the displacements and the parameters 572 representative of the body model are not loaded into the GRAM 521 and are processed by the CPU 51. According to this variant, the parameters representative of haptic effects and/or washout filters and the information representative of the perception or non perception of a motion by the user are stored in the RAM 57 and not in the GRAM 521.

According to another variant, the power supply 58 is external to the device 5.

FIG. 6 illustrates a method for controlling the motion simulator 1 implemented in the device 5, according to a non-restrictive advantageous embodiment of the invention.

During an initialisation step 60, the different parameters of the device 5 are updated. In particular, the parameters representative of the displacements of the force-feedback devices and/or of the biomechanical model are initialised in any way.

Then during a step 61, the speed value of the movement of the part of the body stimulated by the force-feedback device inducing the movement is calculated. The calculation is based on the parameter(s) used for controlling the displacement of the force-feedback device, for example the final position of the force-feedback device at the end of the displacement and/or the speed and the duration of the displacement and/or the acceleration(s) of the force-feedback device during the displacement, etc.

The speed value is advantageously determined by using an algorithm using a biomechanical model of the body of the user or of at least the part of the body undergoing the movement. The biomechanical model corresponds to a simplified representation of the user's body with joints linking limbs or parts of the body, which enables to synthesize the movement of a limb or several interconnected limbs induced by the displacement of the force-feedback device by taking into account the biomechanical constraints and limits involves in the movement of the limbs and joints.

Then during a step 62, the speed value determined at step 61 is compared with a threshold speed value that corresponds to a kinaesthetic perception speed. The threshold speed value is deduced from the biomechanical constraints of the human body, the threshold speed value depending from the part of the body that is impacted by the movement induced by the displacement of the force-feedback device. In an advantageous way, only the joints comprises in the part of the body stimulated by the force-feedback device are taken into account for the comparison between the speed value and the threshold speed value. According to a variant, the body members stimulated by the displacement of the force-feedback device are also taken into account in addition to the joints. The result of the comparison enables to determine whether the movement of the part of the body is perceived by the user, which means to determine whether the displacement of the force-feedback device inducing the movement of the part of the body is perceived by the user. Indeed, if the speed value determined at step 61 is greater than or equal to the threshold speed value, then the displacement of the force-feedback device (and the associated movement of the part of the body) is perceived by the user as the speed value is greater than or equal to the perception speed of the part of the body (i.e. of the joint(s) and/or limb(s) belonging to the part of the body). But if the speed value determined at step 61 is less than the threshold speed value, then the displacement of the force-feedback device (and the associated movement of the part of the body) is not perceived by the user as the speed value is less than the perception speed of the part of the body (i.e. of the joint(s) and/or limb(s) belonging to the part of the body).

Then during a step 63, the parameter(s) used for controlling the displacement of the force-feedback device is controlled and modified if necessary according to the comparison result. If according to the comparison the displacement is determined as not perceived by the user whereas it should be, then the parameter(s) is (are) modified as to amplify the displacement to make the displacement felt by the user. To that aim, the final position of the displacement may be modified as to increase the amplitude of the displacement or the speed and/or the acceleration of the displacement is increased for example. If according to the comparison the displacement is determined as perceived by the user whereas it should not be (for example in case of washout), then the parameter(s) is (are) modified as to reduce the amplitude and/or the speed and/or the acceleration of the displacement to make the displacement not felt by the user. If the result of the comparison is in line with the perception the user should have of the displacement, then the parameter(s) is (area) let unchanged.

Steps 61, 62 and 63 are advantageously reiterated for each force-feedback device and for each haptic effect and/or washout to be performed via the motion simulator comprising the force-feedback devices.

Naturally, the invention is not limited to the embodiments previously described.

In particular, the invention is not limited to a method for controlling a motion simulator but also extends to any device implementing this method and notably any devices comprising at least one CPU and/or at least one GPU. The implementation of calculations necessary to the implementation of the method's steps is not limited either to an implementation in shader type microprograms but also extends to an implementation in any program type, for example programs that can be executed by a CPU type microprocessor.

The invention also relates to a method (and a device configured) for performing a washout and/or for determining whether a movement or displacement is perceived by a user. The invention further relates to a method and device for generating haptic effects.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The present invention may be used in theatres, at home, in automobile or aircraft simulators, theme park attractions, . . . . The device 5 described with respect to FIG. 5 is advantageously equipped with interaction means such as a keyboard a mouse, a joystick or any other modes for introduction of commands, vocal recognition being for instance also possible.

The invention claimed is:

1. Method for controlling at least one force-feedback device associated with at least a part of a body, wherein the method comprises:
    determining a value representative of a speed of a movement of said at least a part of the body according to at least a parameter representative of the displacement of said at least one force-feedback device, the movement of said at least a part of the body being induced by the displacement of said at least one force-feedback device;
    controlling said at least one parameter by modifying said at least one parameter when the determined value is equal to or greater than a reference value, the at least one parameter being modified to decrease said value below said reference value, said at least one parameter being modified in case of washout filtering to make the displacement of said at least one force-feedback device not to be perceived.

2. The method according to claim 1, wherein the determining of the value representative of a speed of the movement of said at least a part of the body is obtained from a biomechanical model of said at least a part of the body.

3. The method according to claim 1 wherein said reference value is determined from biomechanical constraints associated with said at least a part of the body.

4. The method according to claim 1, wherein the displacement of said at least one force-feedback device is perceived when the determined value is greater than or equal to said reference value.

5. The method according to claim 1, wherein said at least one parameter belongs to a group of parameter comprising:
    the amplitude of the displacement;
    the starting time of the displacement;
    the duration of the displacement;
    the starting position of the displacement;
    the speed of the displacement.

6. Device configured for controlling at least one force-feedback device associated with at least a part of a body, characterized in that the device comprises at least one processor configured for:
    determining a value representative of a speed of a movement of said at least a part of the body according to at least a parameter representative of the displacement of said at least one force-feedback device, the movement of said at least a part of the body being induced by the displacement of said at least one force-feedback device;
    controlling said at least one parameter by modifying said at least one parameter when the determined value is equal to or greater than a reference value, the at least one parameter being modified to decrease said value below said reference value, said at least one parameter being modified in case of washout filtering to make the displacement of said at least one force-feedback device not to be perceived.

7. The device according to claim 6, wherein the at least one processor is configured for determining the value representative of a speed of the movement of said at least a part of the body from a biomechanical model of said at least a part of the body.

8. The device according to claim 6, wherein the at least one processor is further configured for determining said reference value from biomechanical constraints associated with said at least a part of the body.

9. The device according to claim 6, wherein the displacement of said at least one force-feedback device is perceived when said value is greater than or equal to said reference value.

10. The device according to claim 6, wherein said at least one parameter belongs to a group of parameter comprising:
    the amplitude of the displacement;
    the starting time of the displacement;
    the duration of the displacement;
    the starting position of the displacement;
    the speed of the displacement.

11. The device according to claim 6, wherein the device comprises a display device displaying an information representative of the possibility to perceive the displacement of said at least one force-feedback device.

12. A non-transitory computer-readable medium comprising a computer program product recorded thereon and capable of being run by a processor, including program code instructions for implementing the method according to claim 1.

* * * * *